United States Patent
Nun et al.

(10) Patent No.: US 9,096,041 B2
(45) Date of Patent: *Aug. 4, 2015

(54) METHOD FOR COATING SUBSTRATES AND CARRIER SUBSTRATES

(75) Inventors: Edwin Nun, Billerbeck (DE); Michael Vetter, Lüdinghausen (DE); Martin Wille, Bochum (DE)

(73) Assignee: Evonik Degussa GmbH, Essen (DE)

( * ) Notice: Subject to any disclaimer, the term of this patent is extended or adjusted under 35 U.S.C. 154(b) by 640 days.

This patent is subject to a terminal disclaimer.

(21) Appl. No.: 13/402,639

(22) Filed: Feb. 22, 2012

(65) Prior Publication Data

US 2012/0202079 A1 Aug. 9, 2012

Related U.S. Application Data

(63) Continuation-in-part of application No. 12/161,031, filed as application No. PCT/EP2006/070249 on Dec. 28, 2006, now Pat. No. 8,652,291, application No. 13/402,639, which is a continuation-in-part of application No. 10/588,952, filed as application No. PCT/EP2004/053577 on Dec. 17, 2004, now Pat. No. 8,568,865.

(30) Foreign Application Priority Data

Feb. 10, 2004 (DE) .......................... 10 2004 006 612
Feb. 20, 2006 (DE) .......................... 10 2006 008 130

(51) Int. Cl.
B32B 33/00 (2006.01)
B32B 37/12 (2006.01)
B32B 37/24 (2006.01)

(52) U.S. Cl.
CPC ................ B32B 33/00 (2013.01); B32B 37/12 (2013.01); B32B 2037/243 (2013.01); Y10T 156/10 (2015.01)

(58) Field of Classification Search
USPC .................. 156/60, 325, 327; 427/207.1, 209
See application file for complete search history.

(56) References Cited

U.S. PATENT DOCUMENTS

| | | | |
|---|---|---|---|
| 3,252,917 A | 5/1966 | Mindick et al. | |
| 4,215,168 A | 7/1980 | Yonemura et al. | |
| 4,355,074 A | 10/1982 | Stemmler et al. | |
| 6,299,668 B1 | 10/2001 | Penth et al. | |
| 6,299,778 B1 | 10/2001 | Penth et al. | |
| 6,309,545 B1 | 10/2001 | Penth et al. | |
| 6,340,379 B1 | 1/2002 | Penth et al. | |
| 6,458,750 B1 | 10/2002 | Dardin et al. | |
| 6,620,320 B1 | 9/2003 | Hying et al. | |
| 6,828,381 B1 | 12/2004 | Armbrust et al. | |
| 6,841,075 B2 | 1/2005 | Penth et al. | |
| 7,083,828 B2 | 8/2006 | Mueller et al. | |
| 7,235,298 B2 | 6/2007 | Katusic et al. | |
| 7,288,501 B2 | 10/2007 | Auer et al. | |
| 7,374,743 B2 | 5/2008 | Katusic et al. | |
| 7,575,832 B2 | 8/2009 | Hennige et al. | |
| 7,682,731 B2 | 3/2010 | Hennige et al. | |
| 7,691,528 B2 | 4/2010 | Hennige et al. | |
| 7,691,529 B2 | 4/2010 | Hennige et al. | |
| 7,790,321 B2 | 9/2010 | Hennige et al. | |
| 7,807,286 B2 | 10/2010 | Hennige et al. | |
| 7,892,673 B2 | 2/2011 | Hennige et al. | |
| 8,016,896 B2 | 9/2011 | Hennige et al. | |
| 8,053,102 B2 | 11/2011 | Hennige et al. | |
| 2001/0036437 A1 | 11/2001 | Gutsch et al. | |
| 2001/0055639 A1 | 12/2001 | Moritz et al. | |
| 2002/0023419 A1 | 2/2002 | Penth et al. | |
| 2003/0206854 A1 | 11/2003 | Gutsch et al. | |
| 2004/0028913 A1 | 2/2004 | Hennige et al. | |
| 2004/0038105 A1 | 2/2004 | Hennige et al. | |
| 2004/0154106 A1 | 8/2004 | Oles et al. | |
| 2005/0031942 A1 | 2/2005 | Hennige et al. | |
| 2005/0070193 A1 | 3/2005 | Hennige et al. | |
| 2005/0084761 A1 | 4/2005 | Hennige et al. | |
| 2005/0087491 A1 | 4/2005 | Hennige et al. | |
| 2005/0103457 A1 | 5/2005 | Nun et al. | |
| 2005/0221192 A1 | 10/2005 | Hennige et al. | |
| 2006/0049376 A1 | 3/2006 | Nun et al. | |
| 2006/0078791 A1 | 4/2006 | Hennige et al. | |
| 2006/0128239 A1 | 6/2006 | Nun et al. | |
| 2006/0141223 A1 | 6/2006 | Oles et al. | |
| 2006/0147675 A1 | 7/2006 | Nun et al. | |
| 2006/0156475 A1 | 7/2006 | Oles et al. | |
| 2006/0172641 A1 | 8/2006 | Hennige et al. | |
| 2006/0222815 A1 | 10/2006 | Oles et al. | |
| 2007/0175362 A1 | 8/2007 | Gutsch et al. | |
| 2007/0184993 A1 | 8/2007 | Scherer et al. | |

(Continued)

FOREIGN PATENT DOCUMENTS

CA 2 244 752 C 6/2005
DE 11 12 940 8/1961

(Continued)

OTHER PUBLICATIONS

Agaskar. Pradyot A., "Functionalised spherosilicates: soluble precursors of inorganic/organic hybrid materials", Colloids and Surfaces, vol. 63, pp. 131-138, 1992.

(Continued)

*Primary Examiner* — Timothy Kennedy
(74) *Attorney, Agent, or Firm* — Oblon, McClelland, Maier & Neustadt, L.L.P.

(57) ABSTRACT

The present invention relates to a method for coating substrates, including applying a composition to a first side of the substrate, the composition containing an inorganic compound, drying the applied composition, applying at least one coating to the first side of the substrate to which the composition is applied, the coating containing a silane, drying the applied coating, and applying at least one barrier layer to a second side of the substrate.

40 Claims, No Drawings

(56) References Cited

U.S. PATENT DOCUMENTS

| | | |
|---|---|---|
| 2007/0213237 A1 | 9/2007 | Scherer et al. |
| 2007/0219101 A1 | 9/2007 | Scherer et al. |
| 2008/0020190 A1 | 1/2008 | Nun et al. |
| 2008/0032197 A1 | 2/2008 | Horpel et al. |
| 2008/0084686 A1 | 4/2008 | Gutsch et al. |
| 2008/0190841 A1 | 8/2008 | Pascaly et al. |
| 2009/0078485 A1 | 3/2009 | Gutsch et al. |
| 2009/0269489 A1 | 10/2009 | Hennige et al. |
| 2010/0000079 A1 | 1/2010 | Horpel et al. |
| 2010/0003401 A1 | 1/2010 | Horpel et al. |
| 2010/0279173 A1 | 11/2010 | Hying et al. |
| 2011/0206971 A1 | 8/2011 | Hennige et al. |

FOREIGN PATENT DOCUMENTS

| | | |
|---|---|---|
| DE | 38 37 397 | 5/1990 |
| DE | 41 34 540 | 4/1992 |
| DE | 198 05 672 | 8/1999 |
| DE | 199 52 040 | 5/2001 |
| DE | 100 60 776 | 6/2002 |
| DE | 101 35 667 | 2/2003 |
| DE | 101 36 456 | 2/2003 |
| DE | 101 42 622 | 3/2003 |
| DE | 101 56 619 | 5/2003 |
| DE | 101 56 622 | 5/2003 |
| DE | 103 01 754 | 11/2003 |
| DE | 103 43 308 | 4/2005 |
| EP | 1 314 695 | 5/2003 |
| JP | 01-006198 | 1/1989 |
| JP | 5-156055 | 6/1993 |
| JP | 10-225658 A | 8/1998 |
| JP | 2001-159099 | 6/2001 |
| JP | 2003-013372 | 1/2003 |
| JP | 2003-26997 A | 1/2003 |
| WO | 98/51747 | 11/1998 |
| WO | 99 15262 | 4/1999 |
| WO | 99/15262 | 4/1999 |
| WO | WO 01/16242 A1 | 3/2001 |

OTHER PUBLICATIONS

Deutsche Norm: DIN 53438, Part 3, pp. 1-3, Jun. 1984.
Deutsche Norm: DIN 53483, pp. 1-3. Jul. 1969.
Deutsche Norm: DIN EN 13523-4, pp. 1-6, Dec. 2001.
Harrison, Philip G. et al., "High Yield Routes to Hexa (Dimethylsilyloxy) Silsesquioxane and Hexa (Bromodimethylsilyloxy) Silsesciuioxane", Main Group Metal Chemistry, vol. 20, No. 3, pp. 137-141, 1997.
Hoebbel, Von D. et al., "Die Konstitution des Tetramethylammoniumsilicats der Zusammensetzung 1, 0 N (CH3)4 OH. 1, 0 SiO2. 8, 0-8, 3 H2 O", Z. anorg. Allg. Chem., vol. 384, pp. 43-52, 1971.
Office Action issued Apr. 21, 2014 in Japanese Patent Application No. 2008-555649 (submitting English language translation only).

METHOD FOR COATING SUBSTRATES AND CARRIER SUBSTRATES

CROSS-REFERENCE TO RELATED APPLICATIONS

This application is a continuation-in-part of U.S. Ser. No. 12/161,031 filed Jul. 16, 2008, which is the national stage of International Application No. PCT/EP06/070249 filed Dec. 28, 2006, which claims the benefit of priority of German Application No. 10 2006 008 130.7 filed Feb. 20, 2006. This application is also a continuation-in-part of U.S. Ser. No. 10/588,952 filed Apr. 25, 2007, which is the national stage of International Application No. PCT/EPO4/053577 filed Dec. 17, 2004, which claims the benefit of priority of German Application No. 10 2004 006 612.4 filed Feb. 10, 2004. The entire contents of these applications are hereby incorporated by reference.

The present invention relates to a method for coating substrates, and coated substrates obtainable by the abovementioned method.

There is in the prior art a need for changing or for improving the surface properties of substrates by coating. In particular, the hardness or the resistance to aggressive substances can be improved by coatings. The substrates which are coated may have very different properties. In the area of building materials, a very wide range of substrates is known. Suitable substrates are hard, i.e. non-flexible, substrates, such as, for example, stones or non-flexible tiles. These are installed in very different areas, for example of a house. However, there is also a very large range of use for flexible building materials. Flexible tiles which can be used, for example, as water-tight cladding of swimming pools may be mentioned in particular here. The flexible building materials have the advantage that they can adapt to the subsurface without complicated adaptation of the substrate being necessary. In addition, forms which are not achievable at all or are achievable only with difficulty using rigid building materials can be realized with flexible building materials.

Moreover, there is a growing need for coated veneers, such as, for example, floor panels or items of furniture, which are equipped with a resistant and scratch-resistant surface. Particularly in the case of high-quality veneers, the requirements with regard to the surface properties are constantly increasing.

Common to all these substrates is that they must have a surface which must meet a very wide range of requirements. One requirement is that there must be resistance to aggressive chemicals or environmental influences. On the other hand, it is advantageous in other areas if the building materials have little tendency to becoming soiled.

On the other hand, in other areas too, such as, for example, woven fabrics and knitted fabrics, there is the possibility of improving surface properties by coatings. Here, the stability of a composite is ensured by the underlying substrate while the resistance to aggressive substances or the tendency to becoming soiled is ensured by applied coatings.

In the case of flexible substrates, it is necessary in particular for applied coatings to be so flexible that they follow any deformation of the flexible substrate without impairment of their structure. If a flexible substrate is bent, stresses occur at the surface of the substrate. These stresses must not, however, result in the coating of a substrate being impaired, as, for example, by cracking. Particularly in the case of a flexible substrate which serves as edge protection, an applied coating must not tear even in the case of a large bending angle.

Thus, the prior art discloses methods for applying coatings to flexible substrates without the coating being adversely affected by deformation of the substrate.

WO 99/15262 discloses a permeable composite material. Here, a coating which is subsequently cured is applied to a permeable support. The coating contains an inorganic component, the inorganic component comprising at least one compound of a metal, semimetal or mixed metal with at least one element of the third to seventh main group of the Periodic Table of the Elements. The coating composition can be obtained by hydrolysis of a precursor. A sol can form here and is subsequently applied to the permeable substrate. The permeable composite materials disclosed in WO 99/15262 are distinguished in that no impairment of the applied coating occurs even in the case of very small radii of curvature of the composite material.

There is, however, a further need for influencing the surface properties of such flexible substrates. Such influencing of substrates can be effected, for example, by coatings which are applied by the sol-gel method. In the case of the sol-gel coatings disclosed in the prior art, however, there is the problem that they can be applied only in relatively thin layer thicknesses. In addition, the sol-gel coatings of the prior art are not suitable for application to flexible substrates since they crack on mechanical deformation of the substrate. As a result of this cracking, it is no longer ensured that the substrate is completely protected by the coating. Rather, aggressive substances can pass through the resulting cracks to the substrate and adversely affect the latter.

In particular, it is not possible with the method of the prior art to apply sol-gel coatings with a large layer thickness to flexible substrates.

The technical object of the present invention is to make available coated substrates which have a coating which reliably protects the substrate from environmental influences, it also being possible for the substrate to be flexible and the coating not being adversely affected by a deformation of the substrate. In particular, adhesives which serve for fastening the substrate should not adversely affect the properties and in particular the surface properties of the coated substrate. A further object of the present invention is to make available a method for providing such improved substrates.

The technical object of the present invention is achieved by a method for coating substrates, comprising the steps:
a) provision of a substrate,
b) application of a composition to a first side of the substrate, the composition containing an inorganic compound and the inorganic compound containing at least one metal and/or semimetal selected from the group consisting of Sc, Y, Ti, Zr, Nb, V, Cr, Mo, W, Mn, Fe, Co, B, Al, In, TI, Si, Ge, Sn, Zn, Pb, Sb, Bi or mixtures thereof and at least one element selected from the group consisting of Te, Se, S, O, Sb, As, P, N, C, Ga or mixtures thereof,
c) drying of the composition applied in step b),
d) application of at least one coating to the first side of the substrate to which the composition is applied in step b), the coating containing a silane of the general formula $(Z^1)Si(OR)_3$, in which $Z^1$ is R, OR or Gly (Gly=3-glycidyloxypropyl) and R is an alkyl radical having 1 to 18 carbon atoms and all R may be identical or different, oxide particles selected from the oxides of Ti, Si, Zr, Al, Y, Sn, Zn, Ce or mixtures thereof, a polymer and an initiator, and
e) drying of the coating applied in step b),
f) application of at least one barrier layer to a second side of the substrate, and g) optional application of at least one layer containing at least one adhesive (adhesive layer) to the barrier layer applied in step f).

The first side of the coated substrate is the side which is visible after use in the intended manner. Accordingly, the second side of the coated substrate is the side with which the coated substrate is applied to a subsurface on use in the intended manner. Preferably, the second side of the substrate is the back of the first side of the substrate.

The method of the present invention is not limited to specific substrates. The substrates may be both open-pore and closed-pore. In particular, the substrate in step a) may be a flexible and/or rigid substrate. In a preferred embodiment, the substrate of step a) is a knitted fabric, a woven fabric, a mesh, a film, a sheet-like structure and/or a metal sheet.

The substrate in step a) is preferably substantially thermally stable at a temperature greater than 100° C. Preferably, the substrate in step a) is substantially thermally stable under the drying conditions of steps c) and/or e).

In a preferred embodiment, the inorganic compound of step b) is selected from $TiO_2$, $Al_2O_3$, $SiO_2$, $ZrO_2$, $Y_2O_3$, BC, SiC, $Fe_2O_3$, SiN, SiP, aluminosilicates, aluminium phosphates, zeolites, partially exchanged zeolites or mixtures thereof. Preferred zeolites are, for example, ZSM-5, Na-ZSM-5 or Fe-ZSM-5 or amorphous microporous mixed oxides which may contain up to 20 percent of nonhydrolysable organic compounds, such as, for example, vanadium oxide/silica glass or alumina/silica/methylsilicon sesquioxide glasses.

The inorganic compound of step b) preferably has a particle size of 1 nm to 10 000 nm. It may be advantageous if the composite material according to the invention has at least two particle size fractions of the at least one inorganic compound. It may also be advantageous if the substrate according to the invention is has at least two particle size fractions of at least two inorganic compounds. The particle size ratio may be from 1:1 to 1:10 000, preferably from 1:1 to 1:100. The ratio of the amounts of the particle size fractions in the composition of step b) can preferably be from 0.01:1 to 1:0.01. The composition of step b) is preferably a suspension, which is preferably an aqueous suspension. The suspension may preferably comprise a liquid selected from water, alcohol, acid or a mixture thereof.

In a further preferred embodiment, the inorganic compound of step b) can be obtained by hydrolysis of a precursor of the inorganic compound containing the metal and/or semimetal. The hydrolysis can be effected, for example, by water and/or alcohol. An initiator, which is preferably an acid or base, which is preferably an aqueous acid or base, may be present during the hydrolysis.

The precursor of the inorganic compound is preferably selected from metal nitrate, metal halide, metal carbonate, metal alcoholate, semimetal halide, semimetal alcoholate or a mixture thereof. Preferred precursors are, for example, titanium alcoholates, such as, for example, titanium isopropylate, silicon alcoholates, such as, for example, tetraethoxysilane or zirconium alcoholates. Preferred metal nitrates are, for example, zirconium nitrate. In an advantageous embodiment, at least half the molar ratio of water, steam or ice is present in the composition, relative to the hydrolysable precursor, based on the hydrolysable group of the precursor.

In a preferred embodiment, the composition of step b) is a sol. In a preferred embodiment, it is possible to use commercially available sols, such as, for example, titanium nitrate sol, zirconium nitrate sol or silica sol.

Preferably, the drying of the composition in step c) is carried out by heating to a temperature of between 50° C. and 1000° C. In a preferred embodiment, drying is effected for 10 minutes to 5 hours at a temperature of 50° C. to 100° C.

In another preferred embodiment, drying is effected in step d) for 1 second to 10 minutes at a temperature of 100° C. to 800° C.

is The drying of step c) can be effected by means of warmed air, hot air, infrared radiation, microwave radiation or electrically generated heat.

In a preferred embodiment, R in the general formula $(Z^1)Si(OR)_3$ is an alkyl radical having 1, 2, 3, 4, 5, 6, 7, 8, 9, 10, 11, 12, 13, 14, 15, 16, 17 and/or 18 carbon atoms.

In a preferred embodiment, the coating of step d) contains a second silane of the general formula $(Z^2)_zSi(OR)_{4-z}$, in which R is an alkyl radical having 1 to 6 carbon atoms and $Z^2$ is $H_aF_bC_n$, in which a and b are integers, all R may be identical or different, a+b=1+2n, z=1 or 2 and n is 1 to 16, or, where $Z^1$ is Gly, $Z^2$ is Am (Am=3-aminopropyl) with z=1. n is preferably 1, 2, 3, 4, 5, 6, 7, 8, 9, 10, 11, 12, 13, 14, 15 and/or 16. In a preferred embodiment, R in the general formula $(Z^2)Si(OR)_3$ is an alkyl radical having 1, 2, 3, 4, 5, 6, 7, 8, 9, 10, 11, 12, 13, 14, 15 and/or 16 carbon atoms.

In a further preferred embodiment, the coating of step d) contains 3-glycidyloxypropyltriethoxysilane and/or 3-glycidyloxypropyltrimethoxysilane as the silane and/or 3-aminopropyltrimethoxysilane and/or 3-aminopropyltriethoxysilane as the second silane. Preferably, the coating of step d) contains tetraethoxysilane as the silane and a silane of the formula $(H_aF_bC_n)Si(OR)_{4-z}$ as the second silane, in which a and b are integers, a+b=1+2n, z is 1 or 2, n is 1 to 16 and all R may be identical or different, all R preferably being identical and containing 1 to 6 carbon atoms.

It is further preferred if the coating of step d) contains tetraethoxysilane, methyltriethoxysilane, octyltriethoxysilane and/or hexadecyltrimethoxysilane as the silane and/or 3,3,4,4,5,5,6,6,7,7,8,8-tridecafluorooctyltriethoxysilane as the second silane.

In a preferred embodiment, the coating of step d) contains, as an initiator, an acid or base which is preferably an aqueous acid or base.

Preferably, the surface of the oxide particles present in the coating of step d) is hydrophobic. Organic radicals $X_{1+2n}C_n$ bonded to silicon atoms are preferably present on the surface of the oxide particles of the coating of step d), n being 1 to 20 and X being hydrogen and/or fluorine. The organic radicals may be identical or different. n is preferably 1, 2, 3, 4, 5, 6, 7, 8, 9, 10, 11, 12, 13, 14, 15, 16, 17, 18, 19 and/or 20. The groups bonded to silicon atoms are preferably methyl, ethyl, propyl, butyl and/or pentyl groups. In a particularly preferred embodiment, trimethylsilyl groups are bonded to the surface of the oxide particles. The organic radicals can preferably be eliminated and more preferably hydrolysed.

The oxide particles of the coating of step d) can be selected from the oxides of Ti, Si, Zr, Al, Y, Sn, Zn, Ce or mixtures thereof. The oxide particles of the coating of step d) are preferably partly hydrolysed under the reaction conditions of step d) on the surface of the oxide particles. Reactive centres which react with the organic silicon compounds of the coating of step d) preferably form thereby. These organic silicon compounds may be covalently bonded to the oxide particles by, for example, —O-bonds during the drying of step e). The oxide particles are covalently crosslinked with the curing coating thereby. The layer thickness of the curing coating can therefore surprisingly be further increased.

The oxide particles may have a mean particle size of 10 to 1000 nm, preferably of 20 to 500 nm, more preferably of 30 to 250 nm. If the coating is to be transparent and/or colourless, preferably only the oxide particles which have a mean particle size of 10 to 250 nm are used. The mean particle size relates to the particle size of the primary particles or, if the oxides are present as agglomerates, to the size of the agglomerates. The particle size is determined by light-scattering methods, for example by means of an apparatus of the type HORIBA LB 550® (from Retsch Technology).

In the coating of step d), the polymer preferably has a mean mass-average molecular weight of at least 3000 g/mol. Preferably, the mean mass-average molecular weight is to at least 5000 g/mol, more preferably at least 6000 g/mol and most preferably at least 10 000 g/mol.

The polymer of the coating of step d) preferably has an average degree of polymerization of at least 50. In a more preferred embodiment, the average degree of polymerization is at least 80, more preferably at least 95 and most preferably at least 150. The polymer of the coating of step d) is preferably selected from polyamide, polyester, epoxy resins, melamine/formaldehyde condensate, urethane/polyol resin or mixtures thereof.

In step d), the coating is preferably applied to the substrate in an amount such that, after drying in step e), a layer of the dried coating having a layer thickness of 0.05 to 10 µm is present on the substrate. A coating of step d) having a layer thickness of 0.1 µm to 9 µm, more preferably of 0.2 µm to 8 µm and most preferably of 0.3 µm to 7 µm is preferably present on the dried substrate.

The drying of the coating in step e) can be carried out by any method which is known to the person skilled in the art. In particular, the drying can be carried out in an oven. More preferably, the drying is carried out using a hot air oven, circulating-air oven or microwave oven or by infrared irradiation. In particular, the drying can preferably be carried out using the methods and drying times of step c). In a preferred embodiment, the coating of step e) is dried by heating to a temperature between 50° C. and 1000° C.

In a more preferred embodiment, at least one further coating can be applied before the application of the coating in step b) and/or d). This further coating may be, for example, a print. Such a print can be applied by any printing process which is familiar to the person skilled in the art, in particular the offset printing process, flexographic printing process, pad printing or inkjet printing process.

In a further embodiment, after application of the coating in step d), at least one further coating can be applied. This further coating is not limited and may be any coating which is known to the person skilled in the art. In particular, this coating may also be a print. In this case too, the print can be applied by any method which is familiar to the person skilled in the art, in particular the offset printing process, flexographic printing process, pad printing and inkjet printing process.

The barrier layer in step f) preferably has substantially no pores and more preferably no pores after drying. In this context, the term pores is understood as meaning openings (pinholes) in the barrier layer. Barrier layers usually have substantially no pores.

The barrier layer in step f) preferably contains film-forming polymers which are preferably selected from synthetic resin dispersions, synthetic resin emulsions, polyvinyl alcohol, modified polyvinyl alcohol, polyvinyl acetate, modified polyvinyl acetate, polymaleic anhydride, polyvinyl methyl ether, vinyl methyl ether/maleic anhydride copolymer, polyvinyl butyl ether, vinyl butyl ether/styrene copolymer, polyurethane, melamine/formaldehyde condensate, urea/melamine condensate or mixtures thereof. The film-forming polymers can preferably be applied as a solution, emulsion and/or dispersion.

The barrier layer applied on the back is intended to prevent substances applied on the barrier layer from being able to penetrate into the substrate and/or the layers applied thereon. Thus, by means of the barrier layer, the coated substrate can be fastened to a very wide range of subsurfaces by a very wide range of techniques or substances. This fastening is preferably effected by adhesive bonding with suitable adhesives. More preferably, it is possible to use all adhesives which are stated further below for the optional adhesive layer.

The barrier layer can preferably be applied from a liquid coating material. It is more preferable if the applied coating material from which the barrier layer is applied is dried after application.

Preferably, one or more barrier layers can be applied.

The barrier layer preferably has a layer thickness in the dried state of 1 to 100 µm, more preferably of 2 to 80 µm and most preferably of 3 to 70 µm. More preferably, the barrier layer has a layer thickness in the dried state of 4 to 60 µm, more preferably of 5 to 50 µm and most preferably of 6 to 20 µm.

The adhesive layer optionally applied in step g) preferably contains an adhesive selected from the group consisting of dispersion adhesives, solvent adhesives, starch pastes, synthetic resin glues, cold glues, heat-seal adhesives, hotmelt adhesives, assembly glues, wallpaper pastes, physically setting adhesives, chemically setting adhesives, one-component adhesives, multicomponent adhesives, two-component adhesives, aminoplast adhesives, phenoplast adhesives, contact adhesives, pressure-sensitive adhesives, reaction adhesives, plastisol adhesives, glues, urea resin glues or mixtures thereof.

The optional adhesive layer (step g) can preferably be applied from a liquid coating material. It is more preferable if the applied adhesive material from which the adhesive layer is applied is dried after application. The adhesives can preferably be applied as a solution, an emulsion and/or dispersion. Alternatively, application of the adhesives from a melt is possible.

The optional adhesive layer (step g) preferably has a layer thickness in the dried state of 1 to 100 µm, more preferably of 2 to 80 µm and most preferably of 3 to 70 µm. More preferably, the optional adhesive layer has a layer thickness in the dried state of 4 to 60 µm, more preferably of 5 to 50 µm and most preferably of 6 to 20 µm.

Preferably, one or more optional adhesive layers may be applied.

The present invention furthermore relates to the coated substrate which is obtainable by the abovementioned method.

The present invention furthermore relates to a method for applying the abovementioned coated substrate to a support substrate, comprising the steps:
  a) provision of a support substrate,
  b) optional application of at least one layer containing at least one adhesive (adhesive layer) to at least one side of the support substrate and
  c) adhesive bonding of the coated substrate to the support substrate, the second side of the coated substrate pointing in the direction of the support substrate and/or pointing in the direction of the optionally applied adhesive layer of the support substrate.

is If an adhesive layer was applied to more than one side of the support substrate in step b), it is sufficient if the coated substrate is applied only to at least one side of the support substrate. After application to the support substrate, the first side of the coated substrate is visible on use of the support substrate in the intended manner.

If the coated substrate is to serve as edge protection, an adhesive layer is preferably applied to at least two adjacent sides of the support substrate in step b).

The support substrate in step a) is preferably a flexible or rigid substrate which is preferably selected from a chipboard, raw chipboard, wood board, plastic panel, parquet floor, wood veneer, veneer or combinations thereof.

If the coated substrate has an adhesive layer, preferably no adhesive layer is applied on the support substrate in step b). Alternatively, if the coated substrate has no adhesive layer preferably an adhesive layer is applied on the support substrate in step b). However, it is also possible for an adhesive layer to be applied neither to the coated substrate nor to the support substrate. In this case, the adhesive bonding of the coated substrate to the support substrate in step c) is preferably effected by the action of elevated pressure and/or elevated temperature, and the coated substrate is preferably adhesively bonded to the support substrate thereby.

The optional adhesive layer of step b) preferably contains an adhesive selected from the group consisting of dispersion adhesives, solvent adhesives, starch pastes, synthetic resin glues, cold glues, heat-seal adhesives, hotmelt adhesives, assembly glues, wallpaper pastes, physically setting adhesives, chemically setting adhesives, one-component adhesives, multicomponent adhesives, two-component adhesives, aminoplast adhesives, phenoplast adhesives, contact adhesives, pressure-sensitive adhesives, reaction adhesives, plastisol adhesives, glues, urea resin glues or mixtures thereof.

The optional adhesive layer (step b) can preferably be applied from a liquid coating material. It is more preferred if the applied adhesive material from which the adhesive layer is applied is dried after application. The adhesive can preferably be applied as solution, emulsion and/or dispersion. Alternatively, application of the adhesive from a melt is possible.

The optional adhesive layer (step b) preferably has a layer thickness in the dried state of 1 to 100 μm, more preferably of 2 to 80 μm and most preferably of 3 to 70 μm. More preferably, the optional adhesive layer has a layer thickness in the dried state of 4 to 60 μm, more preferably of 5 to 50 μm and most preferably of 6 to 20 μm.

Preferably, one or more optional adhesive layers may be applied.

The adhesive bonding of the coated substrate to the support substrate in step c) is preferably effected with the use of elevated pressure and/or elevated temperature. The adhesive bonding is preferably effected by pressing on.

The pressure during the adhesive bonding in step c) is preferably 1 to 100 N/m$^2$, more preferably 2 to 75 N/m$^2$ and most preferably 3 to 50 N/m$^2$. More preferably, the pressure during the adhesive bonding in step c) is 4 to 30 N/m$^2$, more preferably 5 to 25 N/m$^2$ and most preferably 6 to 20 N/m$^2$.

The temperature during the adhesive bonding in step c) is preferably 30 to 300° C., more preferably 40 to 250° C. and most preferably 50 to 220° C.

The duration of pressing of the coated substrate onto the support substrate is preferably 1 second to 60 minutes, more preferably 30 seconds to 50 minutes and most preferably 1 minute to 40 minutes.

The pressure during the adhesive bonding, the temperature and also the duration of pressing on may vary depending on the adhesive used.

The coated substrate and the support substrate are preferably substantially thermally stable and more preferably thermally stable under the adhesive bonding conditions of step c).

The coated support substrate is preferably a floor panel and/or veneer. It is also possible to apply the coated substrate as edge protection on a support substrate. Articles provided with a veneer according to the invention may also be furniture, furniture components, doors and/or windows.

Coated substrates and coated support substrates of the present invention surprisingly exhibit very high flexibility. If the substrate is flexible, the substrate can be bent without the applied coatings being destroyed or torn. In particular, coatings can thus be applied to flexible tiles which adapt to the surface structure of a subsurface without the coating being adversely affected. As already stated, a very wide range of protective layers can be applied as a coating, in particular layers for protecting from aggressive chemicals or dirt-repellent coatings.

In addition, it is surprisingly found that thicker coatings can be applied by means of the method of the present invention, application in a multicoat method being avoided. This proves to be advantageous in particular if scratch-resistant layers are applied to polymeric sheet-like structures. It is also surprising that the coated substrate of the present invention is reversibly extensible and scourable.

The coated support substrates of the present invention and in particular the preferred floor panels and/or veneers have a scratch-resistant and chemical-resistant surface. In this respect, they are superior to coated support substrates of the prior art.

EXAMPLES

Example According to the Invention:
Production of the Coated Substrate:
Preparation of the Composition:

674.56 g of distilled water, 271.48 g of ethanol (96% strength) and 93.376 g of concentrated nitric acid are initially introduced into a stirred container. 11.97 g of Dolapix CE 64 (organic dispersant and deflocculant (polyelectrolyte) for deflocculating oxide ceramic, manufacturer: Zschimmer & Schwarz GmbH & Co. KG, D-56112 Lahnstein) are added to this mixture with stirring.

Thereafter in each case 518.04 g of the aluminas MZS 1 and MZS 3 from Martinswerke are dispersed in succession in the mixture, and the mixture obtained is stirred for a further 12 h.

16.66 g of tetraethoxysilane, 16.66 g of methyltriethoxysilane and 33.32 g of glycidyloxipropyltrimethoxysilane are added to the dispersion and stirring is effected for 24 h.

2.117 g of 25% strength ammonia solution are added to the dispersion and the dispersion is then applied to a PET nonwoven (polyethylene terephthalate nonwoven, Freudenberg FK 22345) in an amount such that, after drying, a coat weight of 220 g/m$^2$ is present. The applied composition is first dried at room temperature and then heated to 220° C. in an oven for 10 s. This composite serves as base material for the following coating.

Production of the Second Coating:

298.95 g of glycidyloxypropyltriethoxysilane (GLYEO) are stirred with 25.65 g of a 1.0% strength nitric acid in demineralized water until the mixture is clear. Thereafter, 417.93 g of a 15% strength by weight dispersion of Aerosil R 812S in ethanol, denatured with methyl ethyl ketone, are added thereto. After stirring for one hour, 257.47 g of 3-aminopropyltriethoxysilane (AMEO) are slowly added thereto. The temperature is limited to not more than 40° C. After the addition of AMEO, stirring is continued for 18 hours at room temperature.

From the second coating material obtained, the coating is applied to the base material by means of a knife coater. Drying is then effected for 30 minutes at 120° C. The dry second coat mass is determined gravimetrically as 30 g/m$^2$.

Production of the Barrier Layer:

The back of the nonwoven provided with the composition and coating is coated with a synthetic resin dispersion (Wormalit VN 6035-22, Henkel KGaA) as a barrier layer using a knife coater. The layer thickness after drying at room temperature was about 8 μm.

When it is bent, the coated PET nonwoven shows very high flexibility. The applied layers do not flake off. Moreover, the coated PET nonwoven is very scratch-resistant, reversibly extensible and highly resistant to scouring according to DIN EN 259-1. The surface obtained is smooth and free of cracks and has a silk gloss appearance. In addition, it is found that the pot life of the coating composition according to the invention is substantially prolonged. Consequently, the coating composition according to the invention can be more easily and effectively processed.

Production of the Coated Support Substrate:

Support Substrate 1:

A polyvinyl acetate glue is manually applied to one side of a raw chipboard (19 mm thick) as a support substrate. On this raw chipboard, the coated PET nonwoven with the barrier layer is adhesively bonded to the applied adhesive layer. This composite is heated at 60° C. for 10 minutes by means of a heatable press in order to obtain the coated support substrate 1.

Support Substrate 2:

A urea resin glue is manually applied to one side of a raw chipboard (19 mm thick) as a support substrate (about 100 g/m² dry). On this raw chipboard, the coated PET nonwoven with the barrier layer is adhesively bonded to the applied adhesive layer. This composite is heated at 90° C. for 5 minutes by means of a heatable press in order to obtain the coated support substrate 2.

Production of the Coated Support Substrate as Edge Protection:

Edge Protection 1:

A hotmelt adhesive containing an EVA copolymer (about 200 g/m²) is applied to an edge of a wood chipboard 19 mm thick. On this coated edge, the coated PET nonwoven with the barrier layer is applied to the applied adhesive layer and the edge thus obtained is adhesively bonded mechanically at a temperature of 215° C. and under elevated pressure.

Edge Protection 2:

A hotmelt adhesive is applied to an edge comprising ABS plastic. On this coated edge, the coated PET nonwoven with the barrier layer is applied to the applied adhesive layer and the edge thus obtained is adhesively bonded mechanically at a temperature of 215° C. and under elevated pressure.

The coated support substrates and edge protections of the present invention are very scratch-resistant, reversibly extensible and highly resistant to scouring according to DIN EN 259-1. The surfaces obtained are smooth, free of cracks and glossy. The edge obtained is not torn open.

The invention claimed is:

1. A method for coating substrates, comprising:
   a) applying a composition to a first side of a substrate, the composition comprising an inorganic compound and the inorganic compound comprising at least one metal and/or semimetal selected from the group consisting of Sc, Y, Ti, Zr, Nb, V, Cr, Mo, W, Mn, Fe, Co, B, Al, In, Ti, Si, Ge, Sn, Zn, Pb, Sb, Bi and mixtures thereof, and at least one element selected from the group consisting of Te, Se, S, O, Sb, As, P, N, C, Ga and mixtures thereof,
   b) drying of the composition,
   c) applying at least one coating to the first side of the substrate to which the composition has been applied, the coating comprising a silane of the general formula (Z1)Si(OR)3, in which Z1 is R, OR or 3-glycidyloxypropyl and R is an alkyl radical having 1 to 18 carbon atoms and all R may be identical or different, oxide particles selected from the group consisting of oxides of Ti, Si, Zr, Al, Y, Sn, Zn, Ce and mixtures thereof, a polymer and an initiator, and
   d) drying the coating, and
   e) applying at least one barrier layer to a second side of the substrate.

2. The method according to claim 1,
wherein
the substrate is a flexible and/or rigid substrate.

3. The method according to claim 1,
wherein
the substrate is a knitted fabric, a woven fabric, a mesh, a film, a sheet-like structure and/or a metal sheet.

4. The method according to claim 1,
wherein
the substrate is substantially thermally stable at a temperature greater than 100° C.

5. The method according to claim 1,
wherein
the substrate is substantially thermally stable during drying of the composition applied to a first side of the substrate and/or the coating.

6. The method according to claim 1,
wherein
the inorganic compound is selected from the group consisting of $TiO_2$, $Al_2O_3$, $SiO_2$, $ZrO_2$, $Y_2O_3$, BC, SiC, $Fe_2O_3$, SiN, SiP, aluminosilicates, aluminium phosphates, zeolites, partly exchanged zeolites and mixtures thereof.

7. The method according to claim 1,
wherein
the inorganic compound has a particle size of 1 nm to 10 000 nm.

8. The method according to claim 1,
wherein
the composition applied to a first side of the substrate is a suspension.

9. The method according to claim 1,
wherein
the inorganic compound is obtained by hydrolysis of a precursor of the inorganic compound comprising the metal and/or semimetal.

10. The method according to claim 9,
wherein
the precursor of the inorganic compound is selected from the group consisting of metal nitrate, metal halide, metal carbonate, metal alcoholate, semimetal halide, semimetal alcoholate and mixtures thereof.

11. The method according to claim 1,
wherein
the composition applied to a first side of the substrate comprises an initiator.

12. The method according to claim 11,
wherein
the initiator is an acid or base.

13. The method according to claim 1,
wherein
the composition is a sol.

14. The method according to claim 1,
wherein
drying of the composition applied to a first side of the substrate is carried out by heating to a temperature between 50° C. and 1000° C.

15. The method according to claim 1,
wherein
the coating comprises a second silane of the general formula (Z2)zSi(OR)4-z, in which R is an alkyl radical having 1 to 8 carbon atoms and Z2 is HaFbCn, a and b being integers, all R may be identical or different, a+b=1+2n, z=1 or 2 and n is 1 to 16, or, where Z1 is 3-glycidyloxypropyl, Z2 is 3-aminopropyl with z=1.

16. The method according to claim 1,
wherein
the coating comprises 3-glycidyloxypropyltriethoxysilane and/or 3-glycidyloxypropyltrimethoxysilane as the silane and/or 3-aminopropyltrimethoxysilane and/or 3-aminopropyltriethoxysilane as the second silane.

17. The method according to claim 1,
wherein
the coating comprises tetraethoxysilane as the silane and a silane of the formula (HaFbCn)zSi(OR)4-z as the second silane, in which a and b are integers, a+b =1+2n, z is 1 or 2, n is 1 to 16 and all R may be identical or different.

18. The method according to claim 1,
wherein
the coating comprises tetraethoxysilane, methyltriethoxysilane, octyltriethoxysilane and/or hexadecyltrimethoxysilane as the silane and/or 3,3,4,4,5,5,6,6,7,7,8,8,8-tridecafluorooctyltriethoxysilane as the second silane.

19. The method according to claim 1,
wherein
the coating comprises, as an initiator, an acid or base.

20. The method according to claim 1,
wherein
the surface of the oxide particles present in the coating is hydrophobic.

21. The method according to claim 1,
wherein
organic radicals X1+2nCn bonded to silicon atoms are present on the surface of the oxide particles of the coating, n being 1 to 20 and X being hydrogen and/or fluorine.

22. The method according to claim 1,
wherein
the polymer of the coating has a mean mass-average molecular weight of at least 3000 g/mol.

23. The method according to claim 1,
wherein
the polymer of the coating has an average degree of polymerization of at least 50.

24. The method according to claim 1,
wherein
the polymer of the coating is selected from the group consisting of polyamide, polyester, epoxy resins, melamine/formaldehyde condensate, urethane/polyol resin and mixtures thereof.

25. The method according to claim 1,
wherein
the coating is applied to the substrate in an amount such that, after drying, a layer of the dried coating having a layer thickness of 0.05 to 10 µm is present on the substrate.

26. The method according to claim 1,
wherein
before application of the composition to a first side of the substrate or the coating, at least one pre-coating is applied.

27. The method according to claim 1,
wherein
after application of the coating, at least one post-coating is applied.

28. The method according to claim 1,
wherein
the drying of the coating is carried out by heating to a temperature between 50° C. and 1000° C.

29. The method according to claim 1,
wherein
the barrier layer is a layer which has substantially no pores.

30. The method according to claim 1,
wherein
the barrier layer comprises at least one film-forming polymer selected from the group consisting of synthetic resin dispersions, synthetic resin emulsions, polyvinyl alcohol, modified polyvinyl alcohol, polyvinyl acetate, modified polyvinyl acetate, polymaleic anhydride, polyvinyl methyl ether, vinyl methyl ether/maleic anhydride copolymer, polyvinyl butyl ether, vinyl butyl ether/styrene copolymer, polyurethane, melamine/formaldehyde condensate, urea/melamine condensate and mixtures thereof.

31. The method according to claim 1,
wherein
the adhesive layer comprises an adhesive selected from the group consisting of dispersion adhesives, solvent adhesives, starch pastes, synthetic resin glues, cold glues, heat-seal adhesives, hotmelt adhesives, assembly glues, wallpaper pastes, physically setting adhesives, chemically setting adhesives, one-component adhesives, multicomponent adhesives, two-component adhesives, aminoplast adhesives, phenoplast adhesives, contact adhesives, pressure-sensitive adhesives, reaction adhesives, plastisol adhesives, glues, urea resin glues and mixtures thereof.

32. A method for applying the coated substrate of claim 1 to a support substrate, comprising:
applying at least one layer comprising at least one adhesive on at least one side of the support substrate and
adhesively bonding the coated substrate to the support substrate, the second side of the coated substrate pointing in the direction of the support substrate and/or pointing in the direction of the applied adhesive layer of the support substrate.

33. The method according to claim 32,
wherein
the support substrate is a flexible or rigid substrate.

34. The method according to claim 32,
wherein
the support substrate is selected from the group consisting of a chipboard, raw chipboard, wood board, plastic panel, parquet floor, wood veneer, veneer and combinations thereof.

35. The method according to claim 32,
wherein
the adhesive layer comprises an adhesive selected from the group consisting of dispersion adhesives, solvent adhesives, starch pastes, synthetic resin glues, cold glues, heat-seal adhesives, hotmelt adhesives, assembly glues, wallpaper pastes, physically setting adhesives, chemically setting adhesives, one-component adhesives, multicomponent adhesives, two-component adhesives, aminoplast adhesives, phenoplast adhesives, contact adhesives, pressure-sensitive adhesives, reaction adhesives, plastisol adhesives, glues, urea resin glues and mixtures thereof.

36. The method according to claim 32, wherein
the adhesive bonding of the coated substrate to the support substrate is effected with the use of elevated pressure and/or elevated temperature.

37. A coated substrate obtained by the method according to claim 1.

38. A coated support substrate obtained by the method according to claim 32.

39. The coated support substrate according to claim 38, wherein the coated support substrate is a floor panel and/or veneer.

40. The method according to claim 1, further comprising applying at least one layer comprising at least one adhesive to the barrier layer.

* * * * *